United States Patent [19]

Bachman et al.

[11] 4,209,959
[45] Jul. 1, 1980

[54] MAGNETIC STORAGE SYSTEM AND METHOD FOR AN AXIAL LEAD SORTER

[75] Inventors: Walter S. Bachman, Acton; Nicholas J. Cedrone, Wellesley Hills, both of Mass.

[73] Assignee: Daymarc Corporation, Waltham, Mass.

[21] Appl. No.: 911,694

[22] Filed: Jun. 1, 1978

[51] Int. Cl.² .................................. B65B 19/34
[52] U.S. Cl. ............................. 53/475; 53/436; 53/446; 53/527; 53/236; 53/244; 198/381; 198/690
[58] Field of Search ............... 53/446, 436, 444, 447, 53/475, 527, 540, 236, 244; 198/690, 381, 406; 271/213; 209/567, 573, 933

[56] References Cited

U.S. PATENT DOCUMENTS

| 2,581,042 | 1/1952 | Otto | 198/381 X |
| 2,617,527 | 11/1952 | Smith | 209/73 |
| 2,975,878 | 3/1961 | Cason | 193/44 |
| 3,231,133 | 1/1966 | Waltz et al. | 221/299 |
| 3,450,259 | 6/1969 | Waltz | 209/74 |
| 3,537,580 | 11/1970 | Bereset | 209/73 |
| 3,570,210 | 3/1971 | Pinnolis | 53/236 X |
| 3,581,889 | 6/1971 | Abraham | 209/74 |
| 3,584,697 | 6/1971 | Danielson | 53/236 X |
| 3,731,783 | 5/1973 | Dreher et al. | 53/236 X |
| 3,741,436 | 6/1973 | Hartline et al. | 198/381 X |
| 3,742,678 | 7/1973 | Wyatt | 53/236 |
| 3,842,573 | 10/1974 | Price | 53/475 |
| 3,871,533 | 3/1975 | Mulcahy et al. | 53/236 X |
| 3,930,212 | 12/1975 | Ioffe et al. | 198/381 X |
| 4,136,765 | 1/1979 | Abraham et al. | 198/381 |

Primary Examiner—Horace M. Culver
Attorney, Agent, or Firm—Kenway & Jenney

[57] ABSTRACT

A magnetic storage system receives electronic axial lead devices, particularly polarized devices such as diodes, that are advancing axially from a sorter. The storage system includes a chute assembly with an upper run that funnels the devices to a stop wall spaced from the lower end of the run. The stopped device forms an acute angle with a magnetic field extending horizontally across the chute assembly to produce a controlled rotation of the device to a horizontal orientation. The reoriented device falls through the spacing to a lower chute run that guides it in a lateral mode of advance to a bin cassette replaceably secured between a pair of magnet pole pieces. The pole pieces have a tapered thickness to develop a downwardly increasing magnetic flux density that promotes a high packing density of the devices in the cassette. A flapper valve is manually operable to block movement of the devices on the second chute assembly while a loaded cassette is being replaced with an empty cassette. The cassette has a key recess that receives a key member secured to one of the pole pieces. The recess extends along one side of the cassette and is visible from the front of the cassette.

14 Claims, 5 Drawing Figures

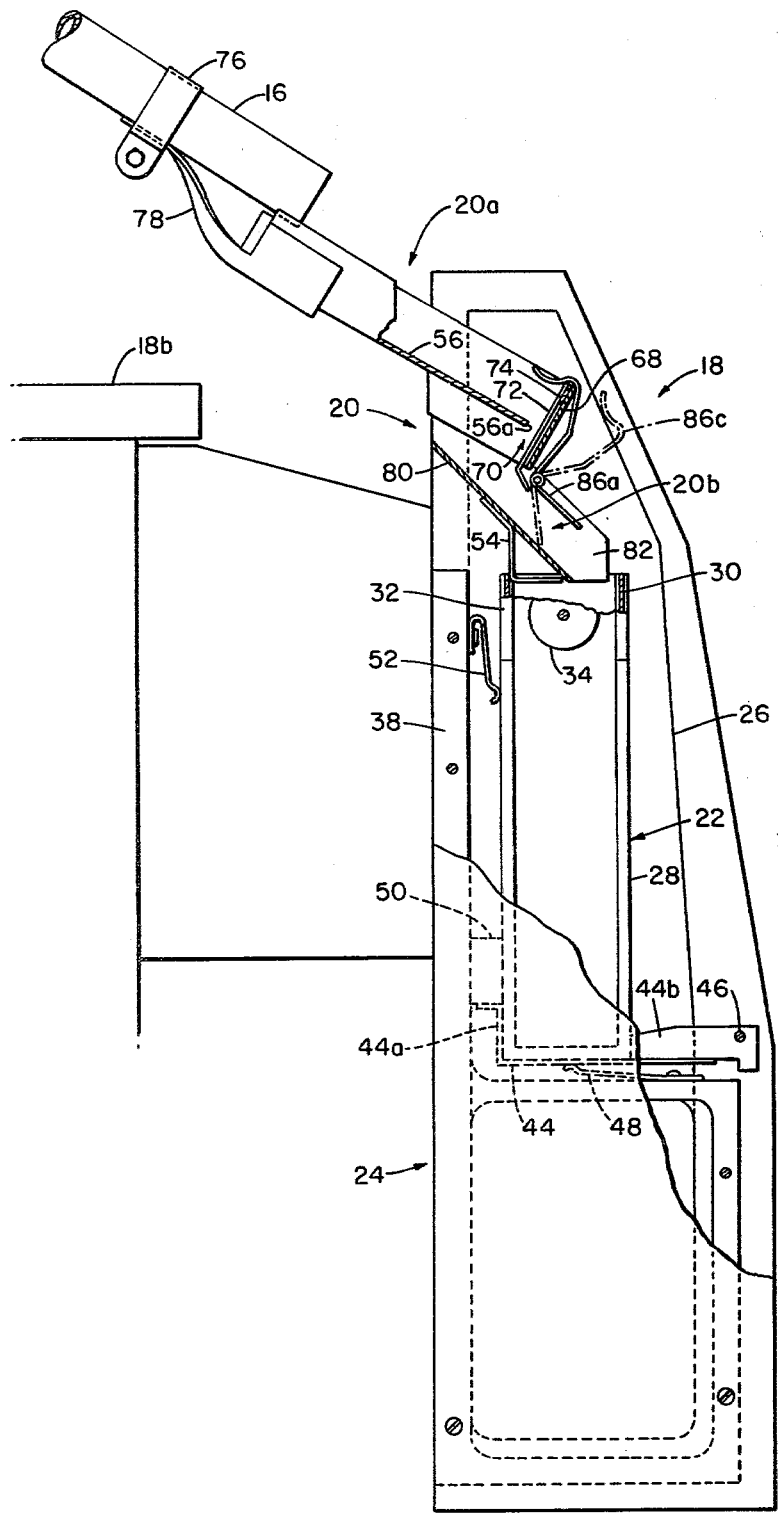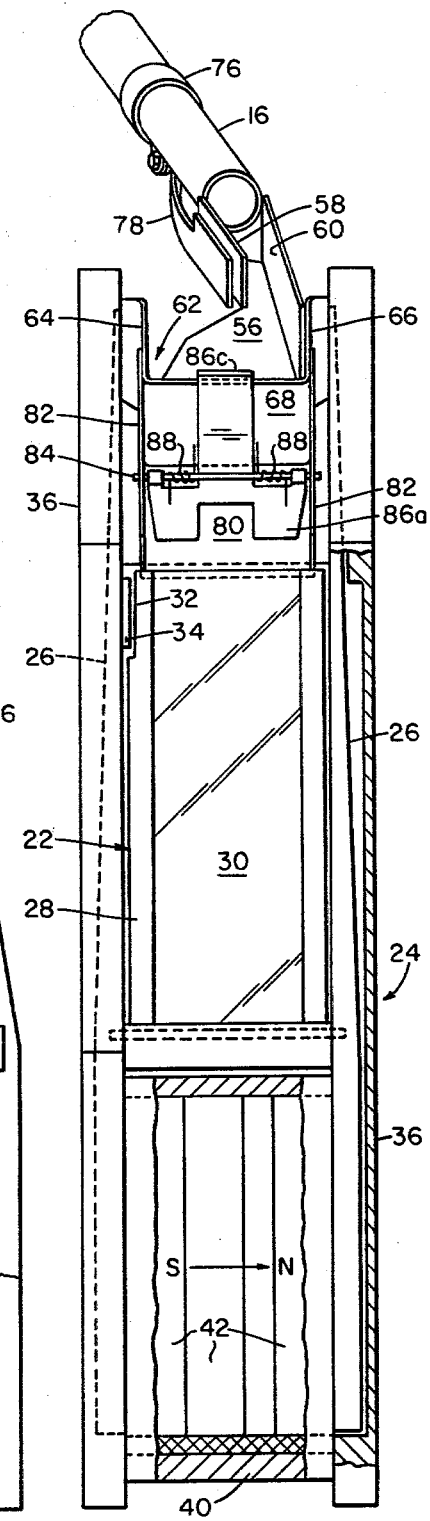
FIG. 2
FIG. 3

MAGNETIC STORAGE SYSTEM AND METHOD FOR AN AXIAL LEAD SORTER

BACKGROUND OF THE INVENTION

This invention relates in general to handling apparatus for electronic devices. More specifically, it relates to a magnetic system for storing devices with axial, magnetically permeable leads, particularly electrically polarized devices such as diodes.

In the manufacture of electronic devices it is necessary to test the devices and sort them according to whether they are defective or according to the value of some parameter. The sorted devices are collected in bins. Production economics require that these testing, sorting and collecting operations be very rapid, reliable and without significant interruption.

Certain devices such as axial lead diodes present special problems. Diodes are electrically polarized, but they typically have a symmetrical configuration so that it is impossible to visually determine which lead is "positive" and which lead is "negative". It is therefore necessary in their manufacture to identify one lead, e.g. the positive side of the diode, and maintain that identity. This is usually done by maintaining a correlation between the polarity and the spatial orientation of the device.

Handling problems of axial lead diodes and similar devices are compounded by the configuration of the devices and their variability. The long, thin leads are easily bent. Both the overall length and the mass of the devices vary. The storage system must not damage the devices and must accommodate these variations. In sorting apparatus where testing is performed on a rotating table and the tested devices are fed to a linear array of collecting bins below the table, variations in the mass of the different devices can result in appreciable variations in the input momentum of the device to the storage system. Also, both the vertical and the horizontal angles of approach of the devices to the bin will vary from bin to bin.

U.S. Pat. Nos. 2,975,878; 3,231,133; and 3,450,259, all assigned to the Hughes Aircraft Co., describe a system for handling, testing, sorting and classifying axial lead, electrically polarized devices. A hopper feeds devices downwardly to a vertical, double track system described in the '878 patent. One track with a spiral groove introduces a 180° rotation in devices that are sensed as having an orientation opposite to those directed down the other track, which introduces no rotation. A mechanical escapement mechanism described in the '133 patent feeds the devices from the track system to an endless belt or track described in the '259 patent. The belt carries the devices to a test station. Depending on the result of the test, an electromagnet may be activated to pull the tested device to a selected storage box, e.g. one for defective devices. In another form, the escapement mechanism feeds the devices directly to a test station adjacent a permanent magnet and a pair of electromagnets control movement of the device along one of three paths to an associated storage box. In either form, the movement of the devices through the system is lateral, that is in a direction perpendicular to the leads.

U.S. Pat. Nos. 3,581,889 and 3,537,580, both assigned to Western Electric Co., describe another system for handling, testing, sorting and storing axial lead, but unpolarized, devices. The '580 patent describes an input bin that orients a random collection of the devices placed at one end in a magnetic field generated by a pair of spaced apart, mutually inclined magnets. The inclination creates a variation of the intensity of magnetic field that urges the devices laterally toward the opposite end of the bin where they are picked off by a magnetic carrier wheel. The wheel rotates the devices under a test station. Electronic circuitry correlates the test results with the action of a blade or electromagnet that strips the devices from the wheel to a sorting device. The '889 patent, describes a horizontal wheel that rotates the devices to one of a succession of chutes that lead to associated storage bins. Circuitry correlates the test results with a specified chute and bin. The devices are removed by energization of an electromagnet and an airflow. This system has no capability to process polarized devices and maintain them in a spatial orientation indicative of their polarity.

While these systems use magnetic fields to control the movement of axial lead devices, there is little teaching with respect to the problems of the output or storage end of the system. Moreover, only the Hughes system deals with polarized devices, and it requires a relatively complex arrangement to orient, advance and process the devices in a manner that retains their polarity-indicating spatial orientation. None of the aforementioned patents address the problem of handling, sorting, and laterally storing polarized axial lead devices that are advancing initially in an axial mode without losing an initial polarity indicating orientation.

It is therefore a principal object of this invention to provide a magnetic system for storing polarized axial lead devices entering the system in an axial mode where the system maintains a correlation between the electrical polarization and the spatial orientation of the device.

Another object is to provide such a storage system that operates effectively for devices having different dimensions, input momenta, and input angles to the system.

A further object is to provide a storage system that provides a readily visible and foolproof arrangement for maintaining the polarization/orientation correlation.

Yet another object is to provide a storage system that allows the replacement of cassettes without interrupting preceeding operations and is highly compact.

A still further object is to provide a storage system with the foregoing advantages that does not damage the devices.

Another object is to provide a storage system that is rapid, reliable, and sufficiently uncomplicated to provide low maintenance requirements and a comparatively low cost of manufacture.

SUMMARY OF THE INVENTION

A system for storing axial lead devices has a chute assembly that receives the devices as they are advancing axially from a sorter and delivers them to a generally rectangular bin cassette in a lateral mode of advance. For electrically polarized devices, a lead with the same polarity is leading during the axial advance. The chute assembly maintains this correlation between the polarity and a spatial orientation. The cassette is replaceably held between a pair of magnet pole pieces having a tapered, upwardly narrowing thickness. The pole pieces create a magnetic field that is oriented generally horizontally across the cassette and increases in intensity in a vertically downward direction. The pole pieces also develop a horizontal magnetic field across the chute assembly located generally above the cassette.

The chute assembly has an upper run that directs the devices toward a stop wall spaced a short distance from the lower edge of the run. The leading end of the device strikes the stop wall at an acute angle to the magnetic field. The stop wall, which preferably includes a damper plate, stops the axial advance of the device. The magnetic field and gravity then produce a controlled rotation of the device, in a known direction of rotation, to a generally horizontal orientation in alignment with the magnetic field. The reoriented device falls through the spacing to a lower run of the chute assembly which carries it in a lateral mode of advance to the cassette. The magnetic field maintains the generally horizontal orientation of the device and promotes a high density packing.

The cassette has a recess extending along one side wall that mates with a key secured on one pole piece. The recess is visible from the front of the cassette and ensures that the polarity of the devices remains correlated within a given spatial orientation during subsequent processing. During replacement of cassettes, a manually operated flapper plate is pivoted to a position where it blocks the movement of devices along the lower run of the chute assembly.

These and other features and objects of the invention will become evident to those skilled in the art from the following detailed description which would be read in light of the accompanying drawings.

BRIEF DESCRIPTION OF THE DRAWINGS

FIG. 2 is a view in side elevation with portions broken away and portions in section of one of the storage systems shown in FIG. 1;

FIG. 3 is a view in front elevation with portions broken away and portions in section corresponding to FIG. 2;

DETAILED DESCRIPTION OF THE PREFERRED EMBODIMENTS

Figure 1:
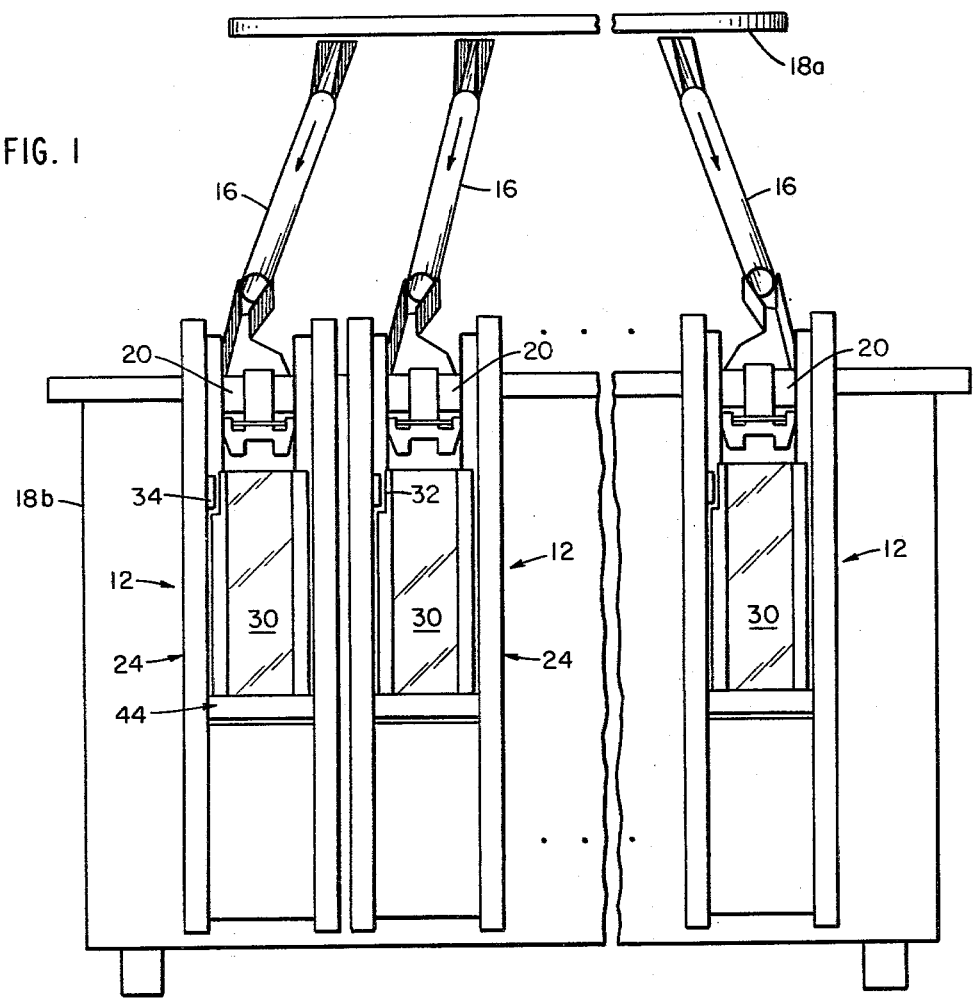
FIG. 1 is a simplified view in front elevation of a linear array of storage systems according to this invention.
Figure 4:
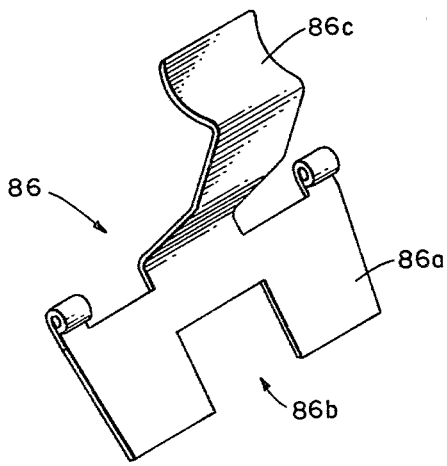
FIG. 4 is an enlarged view in perspective of a flapper plate input valve shown in FIGS. 1-3.

FIG. 1 shows a linear array of off-line storage systems 12 according to this invention adapted for use with a sorter 18 for axial lead devices 14 (FIG. 5), and in particular for electrically polarized devices such as diodes. The devices can vary in mass and size, but each device has a body 14' and a pair of co-axial leads 14a, 14a. In general, the leads are thin, much longer than the body, easily bent, and magnetically permeable. The device is physically symmetric, but if it is electrically polarized, it is operationally asymmetric. For a diode, one lead is "positive" and the other is "negative".

The sorter 18, which is of known construction, utilizes a rotating, horizontally oriented table 18a that carries the devices by a test station. Depending on the results of the test, the devices are each classified and directed down one of a series of distribution tubes 16 that extend generally from the table to the storage systems 12. The devices advance through the delivery tubes axially, that is, with the leads aligned with the direction of advance. If the devices are polarized, the sorter senses the polarity and feeds them to the tubes with the lead of a preselected polarity leading.

The sorter 18 has a generally rectangular base 18b with rows of storage systems 12 supported on at least one of its sides. One such row along one side of the sorter is shown in FIG. 1. This architecture requires that the tubes approach the storage systems 18 at different inclinations, both horizontally (FIG. 1) and vertically. Also, with this architecture it is important for the storage systems to be relatively narrow. In certain prior art sorters, for example, comparatively wide storage bins surrounding the sorter enclose a sufficiently larger area that the sorter is located near the ceiling of the production facility while the bins are near the floor.

With reference to FIGS. 1-5, each storage system 12 includes a chute assembly 20, a bin cassette 22 and a bin assembly 24 that replaceably holds the cassette in position under the chute assembly. The bin assembly includes a pair of magnetic pole pieces 26, 26 that develop a magnetic field across both the cassette 22 and the chute assembly 20. The magnetic lines of force are generally horizontal.

The cassette 22 has a generally rectangular, box-like configuration formed by a generally U-shaped frame 28 that has inwardly facing grooves to hold front and rear panels 30 of a transparent material such as Lexan plastic. The frame is made of a non-magnetic material such as aluminum. The transparent panels allow an operator to readily observe whether the cassette is filled with devices and requires replacement. One side wall of the frame 28 contains a key slot or recess 32 that extends from the front to the rear of the cassette. The recess receives a key or a button 34 secured to the opposite wall of the bin assembly 24. This key system is readily observed from the front of the storage system 12 and provides a positive correlation between the electrical polarity of the stored devices and a given spatial orientation. For example, when a loaded cassette is removed for further processing such as marking and packaging, it is impossible for an operator to lose the correlation by forgetting which side of the cassette corresponds to the "positive" side of the diodes. Also, further processing apparatus will not accept a "reversed" cassette.

The bin assembly 24 includes a pair of generally parallel, upright bin walls 36, 36 that each house one of the pole pieces 26, 26. The walls are secured to a rear wall 38 and a floor 40. A set of permanent magnets 42 and a magnetically permeable spacer 44 span the lower end of the bin assembly between the pole pieces 26, 26. The pole pieces together with the magnets and spacers thus form a large horseshoe magnet. Each pole piece has a tapered, upwardly narrowing thickness (FIG. 3) which produces a corresponding variation in the flux density of the magnetic field. This downwardly increasing field strength drives devices fed to the cassette downwardly to increase the packing density of devices in the cassettes by as much as three times that attainable with a conventional uniform density magnetic field. (The packing density can vary because the devices act like small magnets and repel one another when they are in the magnetic field.)

A platform 44 supports the cassette in the bin assembly and locates it between an upturned rear lip portion 44a and front end portion 44b. The platform 44 pivots on a shaft 46 secured in the portion 44b and journaled in the bin side walls 36, 36. A stiff leaf spring 48 urges the platform upwardly. A stop 50 limits the upward movement of the platform in a position where the platform is substantially level. The cassette is also positioned by a leaf spring 52 secured to the rear bin wall 38 and a "step" 54 secured to the lower end of the chute assembly. This arrangement for mounting and locating the cassette ensures that it cannot be inserted into a loading position in the bin assembly unless the button 34 engages the recess 32.

A principal feature of this invention is the chute assembly 20 that carries the devices 14 from one tube 16 to its associated cassette 22. The assembly 20 has an upper run 20a and a lower run 20b. The upper run includes a floor 56, upright sides 58 and 60, and a generally U-shaped wall member 62 with side walls 64 and 66 and a transverse end wall 68. The upper run is inclined downwardly at an angle of approximately thirty degrees. The member 62 extends below the floor 56 and the end wall 68 is spaced from the lower edge 56a of the floor by a clearance 70. A resilient damper plate 72 is secured to a spacer 74 located at the upper edge of the end wall 68. The spacer 74 establishes a small clearance between the damper plate 72 and the end wall.

Figure 5:
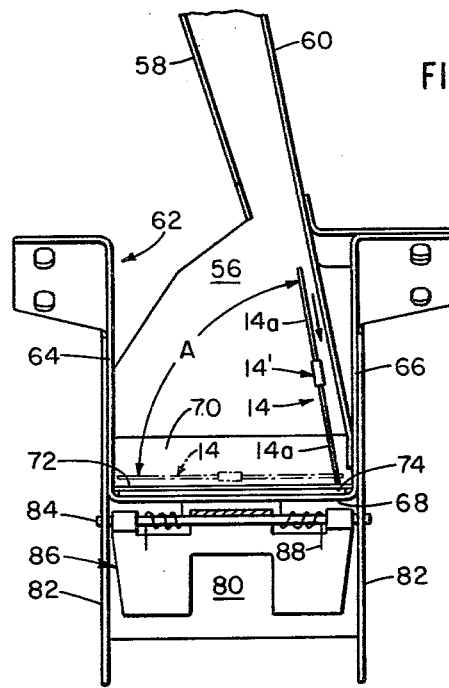
FIG. 5 is an auxiliary plan view of the central portion of the chute assembly along a direction perpendicular to the chute assembly.

A tube clamp 76 supported by an arm 78 welded to the chute wall 58 secures the tube to feed the axially advancing devices 14 onto the upper chute run. The walls 58 and 60 funnel the device toward a stop wall defined by the damper plate 72 and the end wall 68. More specifically, the walls 58 and 60 direct the leading lead of the device to one side of the stop wall near the corner formed by the wall 64 or 66 and the damper plate. The upper run 20a of the chute assembly also ensures that when the device strikes the damper plate it forms an acute angle A with the magnetic lines of force extending horizontally across the chute assembly (FIG. 5). The damper plate is sufficiently resilient to absorb a substantial portion of the kinetic energy of the devices sliding down the upper run and thereby bring the device to a controlled stop with a minimum rebound from the stop wall. The resiliency also minimizes the likelihood of damage to the lead on impact. Because the device is angled with respect to the magnetic field, the field then causes the device to rotate into alignment with the field (phantom position in FIG. 5). Gravity also assists in this rotation which reorients the device from an axial mode of advance to a lateral mode of advance (where the direction of advance is perpendicular to the longitudinal axis of the device). The magnetic field across the upper run should be sufficiently strong to reliably reorient the stopped devices in a preselected direction of rotation but not so strong as to interfere with this advance.

When the device is reoriented to align with the magnetic field, it falls through the clearance 72 to a floor 80 of the lower run 20b. The downwardly increasing magnetic field to some extent urges the devices along the lower run, but a more important function is to maintain the horizontal orientation of the device as it advances laterally. The lower run includes side walls 82, 82 whose upper ends overlie and are spot welded to the walls 64, 66 and whose lower ends project slightly into the upper end of the cassette. The lower run is downwardly inclined at an angle of approximately forty-five degrees from the horizontal.

The side walls 82, 82 support a shaft 84 that carries a flapper plate 86 and a pair of torsion springs 88, 88. The flapper plate can pivot to an accumulating position (phantom position in FIG. 2) where it blocks the movement of the devices down the lower run 20b. A central recess 86b provides a clearance for the bodies 14a. The springs 88, 88 hold the plate 86 in this position to allow the operator to replace a loaded cassette with an empty one. When the fresh cassette is in position, the flapper plate is manually rotated against the springs 88, 88 to a retracted position (solid line position in FIG. 2) where the portion 86a is clear of the devices advancing down the lower run. A handle portion 86c of the flapper plate extends generally upwardly from the shaft 84 and has a turned over catch 86d adapted to engage the upper edge of the wall 68 to secure the flapper plate in the retracted position during normal operation. The flapper plate and the chute assembly are preferably formed of a material such as a non-magnetic stainless steel.

In operation, a succession of devices 14 such as diodes are tested and oriented. A typical operation speed is 12,000 diodes per hour. They are then sorted by distribution to the tubes 16 which each guide them to an associated storage system 18. The diodes advance axially in the tubes with a lead of the same polarity leading. Each tube delivers the diode to the upper run 20a of the chute assembly. The floor 56 and the walls 58 and 60 direct it to one side of the damper 72. The leading end of the device strikes the damper which stops its axial advance down the run. The stopped diode is inclined at an acute angle with respect to the magnetic field extending across the chute assembly. The magnetic field and gravity rotate the diode through the acute angle to a horizontal orientation aligned with the magnetic field and the clearance 70. This rotation is in a preselected direction so that the spatial orientation of the diode retains a correlation with its electrical polarity.

The reoriented diode falls through the clearance to the lower run. The magnetic field maintains the lateral orientation of the diode as it slides down the second run and falls into the cassette. The downwardly increasing intensity of the magnetic field produces a high packing density in the cassette. A fully loaded cassette typically holds about 3,000 devices of average size. This represents a packing density of approximately 70% of the maximum density in the absence of an applied magnetic field.

When a cassette is filled, the operator rotates the flapper plate to the lowered position to accumulate devices on the lower run. The cassette is removed by pressing downwardly on the cassette and pivoting it forward until the rear panel 30 clears the "step" 54 and the lower run 20b. An empty cassette is then inserted. The new cassette must be inserted with its recess 32 aligned with the button 34. If the cassette is reversed, it cannot be inserted into the bin assembly. With the empty cassette in place, the flapper plate is raised and secured and the accumulated devices fall into the new cassette. The flapper plate thus allows the cassette to be replaced without interrupting the operation of the sorter. Typically a cassette is replaced four to eight times per hour. If they are attended to promptly, replacement can be accomplished in about eight seconds. The flapper plate thus saves at least a half minute of production time (100 devices at 12,000 per hour) each hour. If the sorter has a large number of storage systems that fill at different rates, the savings are even larger.

There has been described an off-line magnetic storage system for axially leaded devices such as diodes that accept axially advancing devices and stores them horizontally without losing an initial polarity/orientation correlation and without damaging the leads. The system is compact, reliable and elegantly simple in design, particularly considering that it operates effectively for devices of varying mass, size and direction of approach to the storage system. The system also allows replacement of cassettes without interruption of production and provides a readily visible arrangement for maintaining the polarity/orientation correlation of devices stored in the cassette during further processing.

While this invention has been described with reference to its preferred embodiment for use with one type of sorter, it will be understood that it can be adapted to different machine architectures. Also, while it is primarily designed for use with polarized devices, it can operate effectively with non-polarized devices such as resistors. Further, while the recess 32 on the cassette has been described as a slot with a generally rectangular cross section, the same function can be achieved with other arrangements such as trimming an upper corner along one side of the cassette. These and other modifications and variations of the invention will become apparent to those skilled in the art from the foregoing description and accompanying drawings. Such modifications are intended to fall within the scope of the appended claims.

What is claimed and desired to be secured by Letters Patent is:

1. A system for storing in a cassette electronic devices with magnetically permeable axial leads comprising, in combination,
   chute means that receives said devices advancing in an axial mode,
   means for replaceably holding said cassette generally below said chute means and adapted to receive and store said devices in a horizontal orientation, and
   magnet means for producing a magnetic field extending across said cassette and said chute means in a generally horizontal direction and increasing in intensity in a vertically downward direction,
   said chute means being structured to produce, in combination with said magnetic field, a controlled reorientation of said devices from said axial mode of advance to a lateral mode of advance.

2. The storage system according to claim 1 wherein said devices are electrically polarized and further comprising key means visible from the front of said cassette for correlating the spatial orientation of said cassette and the devices stored in said cassette with a preselected polarity.

3. The storage system according to claim 2 further comprising means disposed between said chute means and said cassette for periodically accumulating said laterally advancing devices.

4. The system according to claim 3 wherein said chute means includes an upper chute run that includes means for stopping said axially advancing device with the longitudinal axis of said device forming an acute angle with respect to said magnetic flux to rotate said device in a preselected direction of rotation to said laterally advancing orientation.

5. The system according to claim 4 wherein said chute means further includes a lower chute run disposed generally below said first chute means and adapted to receive said laterally advancing devices from said first chute means and guide them to said cassette.

6. The system according to claim 5 wherein said first chute means includes a downwardly inclined first floor, a pair of mutually inclined first side walls, and said stopping means comprises an end stop wall spaced from the lower edge of said floor, said first side walls being oriented to direct said axially advancing device to strike said end wall near one lateral edge of said end wall.

7. The system according to claim 6 wherein said end stop wall includes means for absorbing a significant portion of the kinetic energy of said axially advancing devices without damaging said leads.

8. The system according to claim 7 wherein said energy absorbing means is a resilient damper plate.

9. The system according to claim 6 wherein said second chute means includes a downwardly inclined second floor that extends from a point below said spacing to said cassette and a pair of second side walls that extend partially into said cassette.

10. The system according to claim 2 wherein said key means includes a projection secured on said holding means and a recess formed on said cassette adapted to receive said projection, said recess extending along one side of said cassette.

11. The system according to claim 3 wherein said accumulating means comprises a flapper plate rotatable about a horizontal axis between an accumulate position in which said flapper plate blocks the lateral movement of said devices from said second chute and a feed position in which said flapper plate is clear of said laterally advancing devices.

12. A method for storing magnetically permeable axial lead devices in a cassette that are advancing in an axial mode comprising the steps of
   A. providing a magnetic field oriented horizontally across said cassette and having a magnetic flux density that increases in a downward direction from a region above said cassette,
   B. guiding said axially advancing device under the influence of gravity and said magnetic field in a direction of advance that forms an acute angle with said magnetic field,
   C. stopping said axial advance in said region,
   D. rotating said stopped device under the influence of said magnetic field and gravity to a laterally advancing orientation, and
   E. guiding said reoriented device laterally to said cassette under the influence of gravity and said downwardly increasing magnetic field.

13. The method of claim 12 further comprising the step of periodically accumulating said reoriented devices before they enter said cassette.

14. The method of claim 12 further comprising the steps of providing a key recess on said cassette visible from the front of said cassette to maintain a correlation between the spatial orientation of the devices stored in said cassette and a preselected lead of said device.

* * * * *